US012440773B2

(12) United States Patent
Cai

(10) Patent No.: US 12,440,773 B2
(45) Date of Patent: Oct. 14, 2025

(54) PROTECTIVE CASE ASSEMBLY FOR HANDHELD GAME CONSOLE

(71) Applicant: SHENZHEN DEONE INNOVATION TECHNOLOGY CO., LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

(*) Notice: Subject to any disclaimer, the term of this patent is extended or adjusted under 35 U.S.C. 154(b) by 297 days.

(21) Appl. No.: 18/324,918

(22) Filed: May 26, 2023

(65) Prior Publication Data

US 2024/0149175 A1 May 9, 2024

(30) Foreign Application Priority Data

Nov. 7, 2022 (CN) ......................... 202222953884.5

(51) Int. Cl.
*A63F 13/98* (2014.01)
*A63F 13/92* (2014.01)

(52) U.S. Cl.
CPC .............. *A63F 13/98* (2014.09); *A63F 13/92* (2014.09)

(58) Field of Classification Search
None
See application file for complete search history.

(56) References Cited

U.S. PATENT DOCUMENTS 7,833,097 B1 * 11/2010 Maddox .................. A63F 13/23 463/47
8,634,873 B2 * 1/2014 Jones .................. H04M 1/0247 455/66.1
2003/0109314 A1 * 6/2003 Ku .......................... A63F 13/24 463/47
2005/0078441 A1 * 4/2005 Lin ......................... A63F 13/92 361/679.59
2007/0227923 A1 * 10/2007 Kidakarn ............... B65D 85/00 206/320
2010/0081505 A1 * 4/2010 Alten .................... G06F 1/1632 463/47
2010/0195279 A1 * 8/2010 Michael ................ G06F 1/1632 361/679.41

(Continued)

FOREIGN PATENT DOCUMENTS

CN 218793831 U * 4/2023

*Primary Examiner* — Tramar Harper
(74) *Attorney, Agent, or Firm* — HOWARD M COHN and Associates, LLC

(57) ABSTRACT

A protective case assembly for a handheld game console includes a bottom shell and an accessory. The bottom shell includes a supporting surface and a bottom side surface. The supporting surface is attached to a game console body of the handheld game console, and the supporting surface is configured to support the game console body of the handheld game console. The bottom side surface is disposed at a back portion of the supporting surface, and at least one sliding groove is disposed on the bottom side surface. A fitting portion is disposed on the accessory, the fitting portion is matched with the at least one sliding groove. The at least one sliding groove is slidably connected to the fitting portion. The handheld game console is enabled to be better protected, and the protective case assembly for the handheld game console is enabled to meet requirements of different application scenarios.

17 Claims, 4 Drawing Sheets

(56) References Cited

U.S. PATENT DOCUMENTS

| | | | | |
|---|---|---|---|---|
| 2013/0341214 | A1* | 12/2013 | King | A63F 13/98 206/216 |
| 2014/0265762 | A1* | 9/2014 | Murphy | G06F 1/1626 312/223.1 |
| 2021/0194529 | A1* | 6/2021 | Kim | H04B 1/3888 |
| 2022/0151354 | A1* | 5/2022 | Soderstrom | H04M 1/185 |

* cited by examiner

PROTECTIVE CASE ASSEMBLY FOR HANDHELD GAME CONSOLE

TECHNICAL FIELD

The present disclosure relates to a technical field of handheld game consoles, and in particular to a protective case assembly for a handheld game console.

BACKGROUND

Handheld game consoles, further called potable game consoles, handheld game players, or portable game players, are greatly favored by consumers since the handheld game consoles are convenient for carrying and may provide entertainment for people in a short time, such as a process of waiting for cars, queuing, etc. Due to a fact that the handheld game consoles are large in size and are easy to be scratched in a carry-on process, protective cases fitting the handheld game consoles further appear on the market. However, current protective cases for the handheld game consoles generally have a single function of protecting the handheld game consoles, which cannot meet requirements of different application scenarios.

Therefore, how to provide a protective case for the handheld game consoles capable of protecting the handheld games consoles and further meeting the requirements of the different application scenarios is a problem to be solved by those who skilled in the art.

SUMMARY

In view of above, the present disclosure provides a protective case assembly for a handheld game console, in which a sliding groove is disposed on a bottom wall surface of the protective case assembly for the handheld game console, a fitting portion for matching with the sliding groove is disposed on an accessory, to slidably connect a bottom shell of the protective case assembly for the handheld game console to the accessory, thereby not only enabling the handheld game console to be better protected, but also enabling the protective case assembly for the handheld game console to meet requirements of different application scenarios.

The present disclosure provides a protective case assembly for a handheld game console, including a bottom shell and an accessory. The bottom shell includes a supporting surface and a bottom side surface. The supporting surface is attached to a game console body of the handheld game console, and the supporting surface is configured to support the game console body of the handheld game console. The bottom side surface is disposed at a back portion of the supporting surface, and at least one sliding groove is disposed on the bottom side surface. A fitting portion is disposed on the accessory, the fitting portion is matched with the at least one sliding groove. The at least one sliding groove is slidably connected to the fitting portion.

Furthermore, the protective case assembly for the handheld game console further includes a surface cover, the surface cover is snap-connected to the bottom shell.

Furthermore, the at least one sliding groove includes a groove support and groove edges, the groove edges extend toward an outer portion of a plane where the groove support is located along side edges of the groove support, an included angle is formed between an extension direction of each of the groove edges and the plane where the groove support is located, and the groove support is fixedly connected to the groove edges.

Furthermore, the at least one sliding groove is a racetrack-shaped sliding groove, the groove support and the groove edges are disposed on a group of opposite side edges of the sliding groove and are disposed on outer surfaces of the opposite side edges, where the outer surfaces of the opposite side edges face distal from each other.

Furthermore, the at least one sliding groove is a group of strip-shaped grooves, where the strip-shaped grooves are oppositely disposed, the groove support and the groove edges are disposed on outer surfaces of the strip-shaped grooves, where the outer surfaces of the strip-shaped grooves face distal from each other.

Furthermore, the accessory is a supporting frame.

Furthermore, the accessory is a mobile power supply.

Furthermore, the accessory is a mobile hard disk.

Furthermore, the accessory is a docking station.

Furthermore, two sliding grooves are disposed on the bottom side surface, each of the two sliding grooves is slidably connected to the accessory.

Compared with the prior art, the protective case assembly for the handheld game console of the present disclosure has following beneficial effects.

According to the protective case assembly for the handheld game console of the present disclosure, the sliding groove is disposed on the bottom side surface of the protective case assembly for the handheld game console, the fitting portion for matching with the sliding groove is disposed the accessory, so that the bottom shell of the protective case assembly for the handheld game console is capable of being slidably connected to the accessory, thereby not only enabling the handheld game console to be better protected, but also enabling the protective case assembly for the handheld game console to meet requirements of different application scenarios.

DETAILED DESCRIPTION

Figure 1:
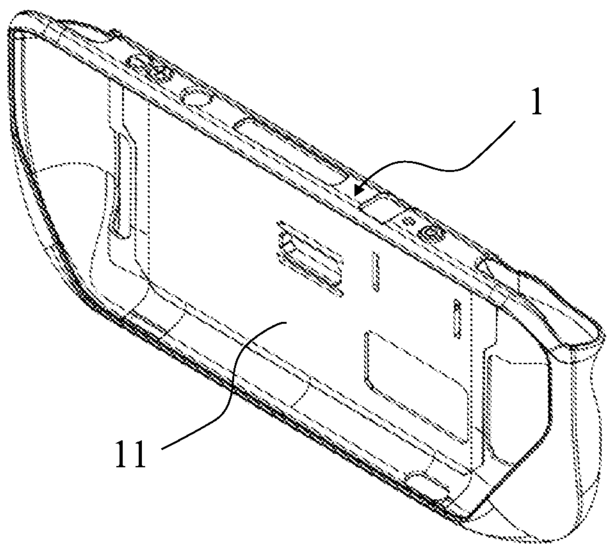
FIG. 1 is a structural schematic diagram of a front side of a bottom shell of a protective case assembly for a handheld game console according to one embodiment of the present disclosure.
Figure 2:
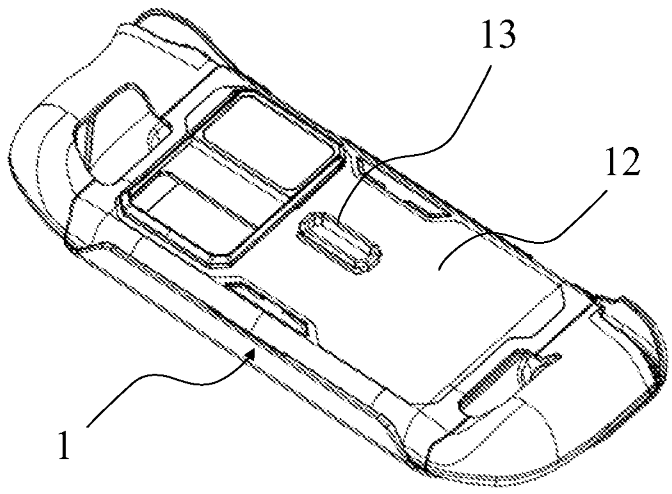
FIG. 2 is a structural schematic diagram of a rear side of the bottom shell of the protective case assembly for the handheld game console according to one embodiment of the present disclosure.

In order to facilitate better understanding of objectives, structures, features, and effects of the present disclosure, the protective case assembly of the handheld gaming machine of the present disclosure is further described with reference to the accompanying drawings and specific embodiments.

As shown in FIGS. 1-6, the present disclosure provides a protective case assembly for a handheld game console, including a bottom shell 1 and an accessory 3. The bottom shell 1 includes a supporting surface 11 and a bottom side surface 12. The supporting surface 11 is attached to a game console body of the handheld game console, and the supporting surface 11 is configured to support the game console body of the handheld game console. The bottom side surface 12 is disposed at a back portion of the supporting surface 11, and at least one sliding groove 13 is disposed on the bottom side surface 12. A fitting portion 31 is disposed on the accessory 3, the fitting portion 31 is matched with the at least one sliding groove 13. The at least one sliding groove 13 is slidably connected to the fitting portion 31.

In the embodiment, the supporting surface 11 is attached to the game console body of the handheld game console, and a shape of the supporting surface 11 is matched with a shape of the handheld game console, the bottom side surface 12 is disposed at the back portion of the supporting surface 11, and two sliding grooves 13 are disposed on the bottom side surface 12. Certainly, in other embodiments, a number of the sliding groove 13 may also be another number, such as one, three, four, etc., which is not limited thereto. The sliding grooves 13 may be uniformly distributed on the bottom side surface 12 according to specific application scenarios of the game console body of the handheld game console, and the sliding groove 13 is slidably connected to the accessory 3. Specifically, the fitting portion 31 matching with the sliding groove 13 is disposed on the accessory 3, a shape of the fitting portion 31 is matched with a shape of the sliding groove 13. As an improvement, in the embodiment, the accessory 3 may slide into the sliding groove 13 along a horizontal direction of a plane of the bottom shell 1 of the protective case assembly of the handheld game console to slidably connect to the bottom shell 1 of the protective case assembly of the handheld game console, the accessory 3 may also slide into the sliding groove 13 along a vertical direction of the plane of the bottom shell 1 of the protective case assembly of the handheld game console to slidably connect to the bottom shell 1 of the protective case assembly of the handheld game console. Certainly, in other embodiments, the accessory 3 may also slide into the sliding groove 13 along other directions of the plane of the bottom shell 1 of the protective case assembly of the handheld game console, which is not limited thereto. According to the protective case assembly for the handheld game console of the present disclosure, the sliding groove 13 is disposed on the bottom side surface 12 of the protective case assembly for the handheld game console, the fitting portion 31 for matching with the sliding groove 13 is disposed on the accessory 3, so that the bottom shell 1 of the protective case assembly for the handheld game console is slidably connected to the accessory, thereby not only enabling the handheld game console to be better protected, but also enabling the protective case assembly for the handheld game console to meet requirements of different application scenarios.

As shown in FIGS. 1-6, the protective case assembly for the handheld game console further includes a surface cover 2, the surface cover 2 is snap-connected to the bottom shell 1.

In the embodiment, the surface cover 2 and the bottom shell 1 are snap-connected, and when the handheld game console is not in use, the handheld game console may be fully wrapped in the surface cover 2 and the bottom shell 1 of the protective case assembly for the handheld game console, so that the game console is comprehensively protected.

As shown in FIGS. 2-6, the at least one sliding groove 13 includes a groove support 132 and groove edges 131, the groove edges 131 extend toward an outer portion of a plane where the groove support 132 is located along side edges of the groove support 132, an included angle is formed between an extension direction of each of the groove edges 131 and the plane where the groove support 132 is located, and the groove support 132 is fixedly connected to the groove edges 131. At least one first guide slope 1311 is provided between the group of opposite side edges of the groove edges 131 for guiding groove support of the slot on the accessory, and the groove support 132 includes at least one second guide slope 1321 thereon for guiding edges of the slot on the accessory. Each outer surface of the groove edges 131 is provided with a third guide slope 1312 for avoiding outer surface of the groove edge 131 from contacting the accessory.

In the embodiment, the groove support 132 is disposed at a bottom portion of the at least one sliding groove 13, the groove edges 131 are respectively disposed along the same vertical direction of two side edges of the groove support 132, and the groove support 132 and the groove edges 131 at the two side edges are fixedly connected to form the sliding groove 13 in a concave shape. As an improvement, in the embodiment, the groove support 132 and the groove edges 131 at the two side edges are integrally formed. Certainly, in other embodiments, the groove support 132 and the groove edges 131 at the two side edges are separately formed, and are assembled into a whole after being formed, or, the groove support 132 is integrally formed with the groove edge 131 at a first side edge, and separately formed with the groove edge at a second side edge, then the groove support 132 and the groove edges 131 respectively at the first side edge and the second side edge are assembled into a whole after being completely formed, or, the groove support 132 and the groove edges 131 at the two side edges are assembled in other assembling manners, which are not limited thereto.

Figure 3:
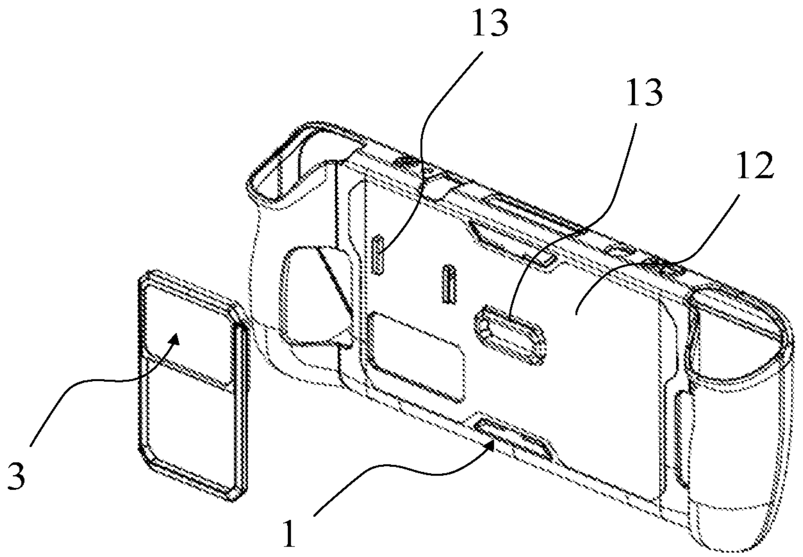
FIG. 3 is an exploded schematic diagram of the bottom shell of the protective case assembly for the handheld game console shown in FIG. 2.
Figure 4:
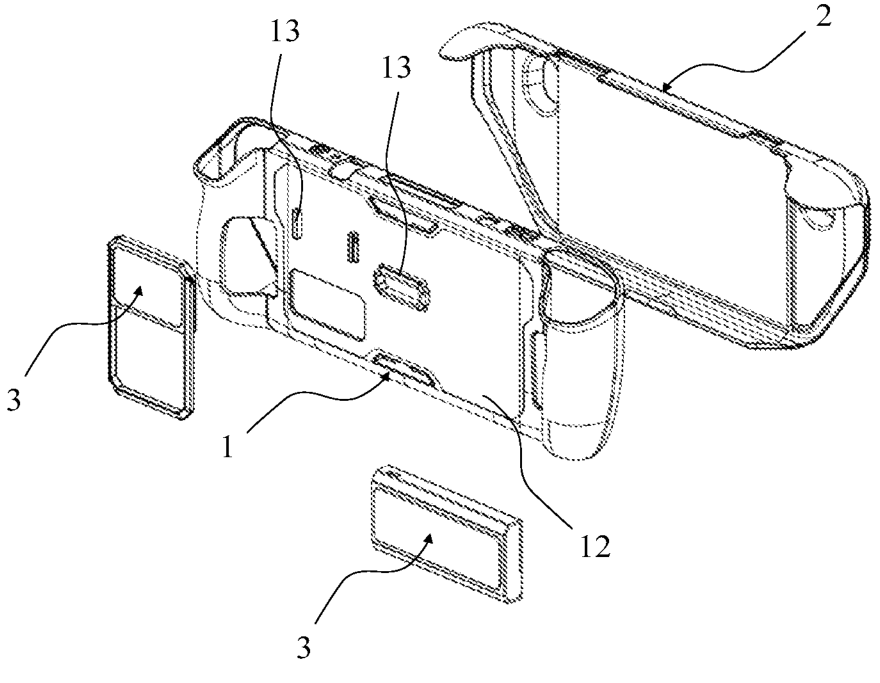
FIG. 4 is a structural schematic diagram of the protective case assembly for the handheld game console according to another embodiment of the present disclosure.
Figure 5:
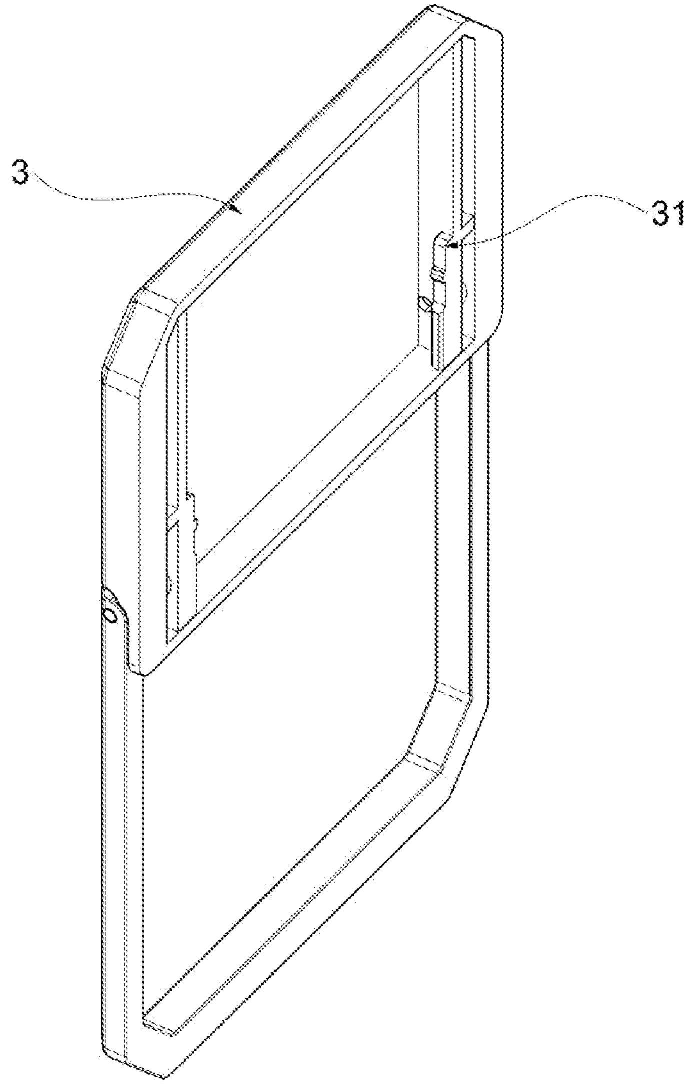
FIG. 5 is a structural schematic diagram of an accessory according to one embodiment of the present disclosure, where the accessory is a supporting frame.
Figure 6:
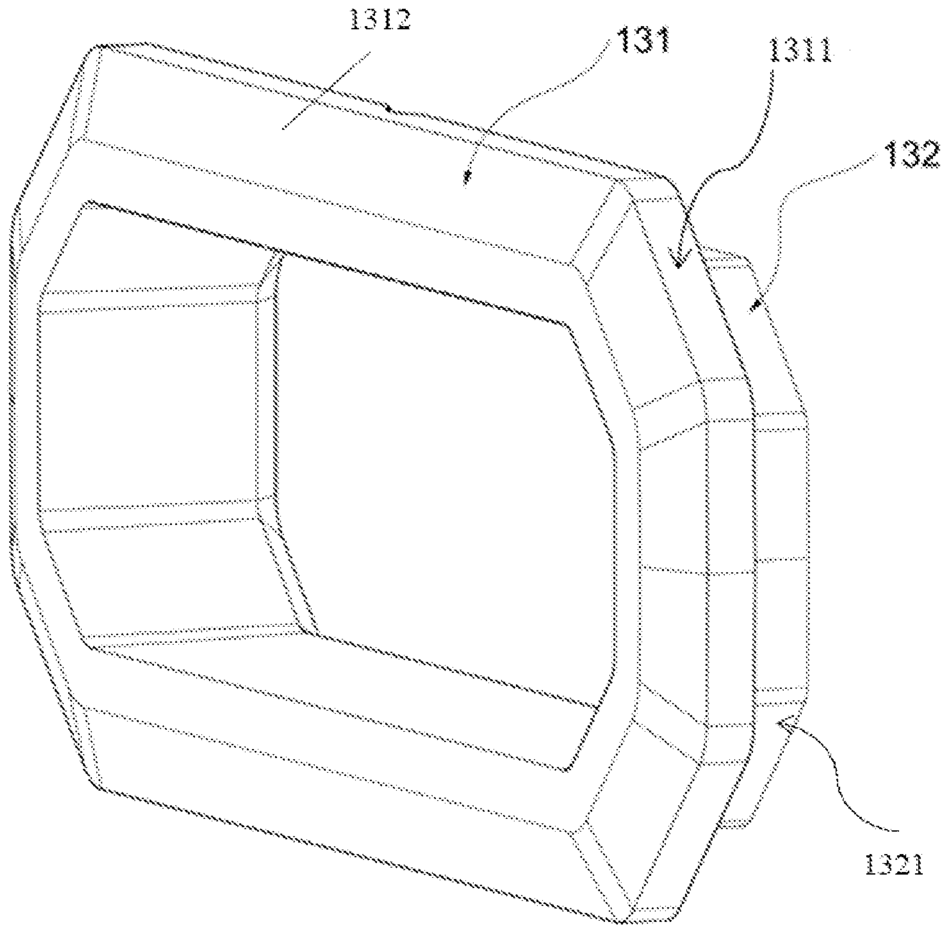
FIG. 6 is a structural schematic diagram of a sliding groove according to one embodiment of the present disclosure.

As shown in FIGS. 3 and 4, the two sliding grooves 13 are disposed on the bottom side surface 12, each of the two sliding grooves 13 is slidably connected to the accessory 3.

A first one of the two sliding grooves 13 is a racetrack-shaped sliding groove, the groove edges 131 are disposed on a group of opposite side edges of the sliding groove body and are disposed on outer surfaces of the opposite side edges, where the outer surfaces of the opposite side edges face distal from each other, namely that the groove edges 131 arranged on the pair of opposite side edges of the groove support 132 extend in mutually opposite directions and away from each other.

In the embodiment, the first one of the two sliding grooves 13 is racetrack-shaped, on the one hand, the racetrack-shaped sliding groove is of an integrated structure, which effectively saves process steps of a production process, and on the other hand, by increasing contact areas between the sliding groove 14 and connecting components, the accessory 3 and the bottom shell 1 of the protective case assembly for the handheld game console are more stably and firmly connected.

A second one of the two sliding grooves 13 is a group of strip-shaped grooves, where the strip-shaped grooves are oppositely disposed, the groove support 132 and the groove edges 131 are disposed on outer surfaces of the strip-shaped grooves, where the outer surfaces of the strip-shaped grooves face distal from each other.

In the embodiment, the second one of the two sliding grooves 13 is configured as the group of strip-shaped grooves, where the strip-shaped grooves are oppositely disposed, the groove support 132 and the groove edges 131 are disposed on outer surfaces of the strip-shaped grooves, where the outer surfaces of the strip-shaped grooves face distal from each other, which effectively saves materials and further reduces production costs.

As an improvement, the accessory 3 may be a supporting frame, a mobile power supply, a mobile hard disk, or a docking station, which is not limited thereto.

In view of above, the present disclosure provides the protective case assembly for the handheld game console, in which the sliding groove is disposed on the bottom side surface of the protective case assembly for the handheld game console, the fitting portion for matching with the sliding groove is disposed on the accessory, to slidably connect the bottom shell of the protective case assembly for the handheld game console to the accessory, thereby not only enabling the handheld game console to be better protected, but also enabling the protective case assembly for the handheld game console to meet requirements of different application scenarios.

Above detailed description is merely illustrative of the preferred embodiments of the present disclosure, and is not intended to limit the scope of the present disclosure, and therefore, any equivalent technical changes made using the present specification and drawings are all included within the scope of the present disclosure.

What is claimed is:

1. A protective case assembly for a handheld game console, comprising:

a bottom shell; and an accessory;

wherein the bottom shell comprises a supporting surface and a bottom side surface; the supporting surface is attached to a game console body of the handheld game console, and the supporting surface is configured to support the game console body of the handheld game console; the bottom side surface is disposed at a back portion of the supporting surface, and at least one sliding groove is disposed on the bottom side surface; a fitting portion is disposed on the accessory, the fitting portion is matched with the at least one sliding groove; the at least one sliding groove is slidably connected to the fitting portion; the at least one sliding groove comprises a groove support and groove edges, the groove edges extend toward an outer portion of a plane where the groove support is located along side edges of the groove support, an included angle is formed between an extension direction of each of the groove edges and the plane where the groove support is located, and the groove support is fixedly connected to the groove edges, wherein the at least one sliding groove is of an annular shape, the groove edges are disposed on a group of opposite side edges of the sliding groove and are disposed on outer surfaces of the opposite side edges and extending outward therefrom, where the outer surfaces of the opposite side edges face distal from each other.

2. The protective case assembly for the handheld game console according to claim 1, wherein the protective case assembly for the handheld game console further comprises a surface cover, the surface cover is snap-connected to the bottom shell.

3. The protective case assembly for the handheld game console according to claim 1, wherein the at least one sliding groove is a racetrack-shaped sliding groove.

4. The protective case assembly for the handheld game console according to claim 3, each outer surface of the groove edges is provided with a third guide slope for avoiding outer surface of the groove edge from contacting the accessory.

5. The protective case assembly for the handheld game console according to claim 1, wherein the at least one sliding groove is a group of strip-shaped grooves.

6. The protective case assembly for the handheld game console according to claim 1, wherein the accessory is a supporting frame.

7. The protective case assembly for the handheld game console according to claim 1, wherein the accessory is a mobile power supply.

8. The protective case assembly for the handheld game console according to claim 1, wherein the accessory is a mobile hard disk.

9. The protective case assembly for the handheld game console according to claim 1, wherein the accessory is a docking station.

10. The protective case assembly for the handheld game console according to claim 1, wherein two sliding grooves are disposed on the bottom side surface, each of the two sliding grooves is slidably connected to the accessory.

11. The protective case assembly for the handheld game console according to claim 1, wherein the groove edges arranged on the pair of opposite side edges of the at least one sliding groove extend in mutually opposite directions and away from each other.

12. The protective case assembly for the handheld game console according to claim 1, wherein at least one first guide slope is provided between the group of opposite side edges of the sliding groove for guiding grooves support of the slot on the accessory.

13. The protective case assembly for the handheld game console according to claim 3, wherein the groove support comprises at least one second guide slope thereon for guiding edges of the slot on the accessory.

14. The protective case assembly for the handheld game console according to claim 1, wherein the pair of opposite side edges of the groove support are spaced from each other.

15. The protective case assembly for the handheld game console according to claim 1, wherein the included angle is ranged from 45 degrees to 90 degrees.

16. The protective case assembly for the handheld game console according to claim 1, wherein the included angle is ranged from 30 degrees to 45 degrees.

17. The protective case assembly for the handheld game console according to claim 1, wherein the included angle is ranged from 90 degrees to 110 degrees.

* * * * *